June 8, 1943.  O. H. BASQUIN  2,321,121
GAUGING APPARATUS
Filed July 18, 1939   2 Sheets-Sheet 2
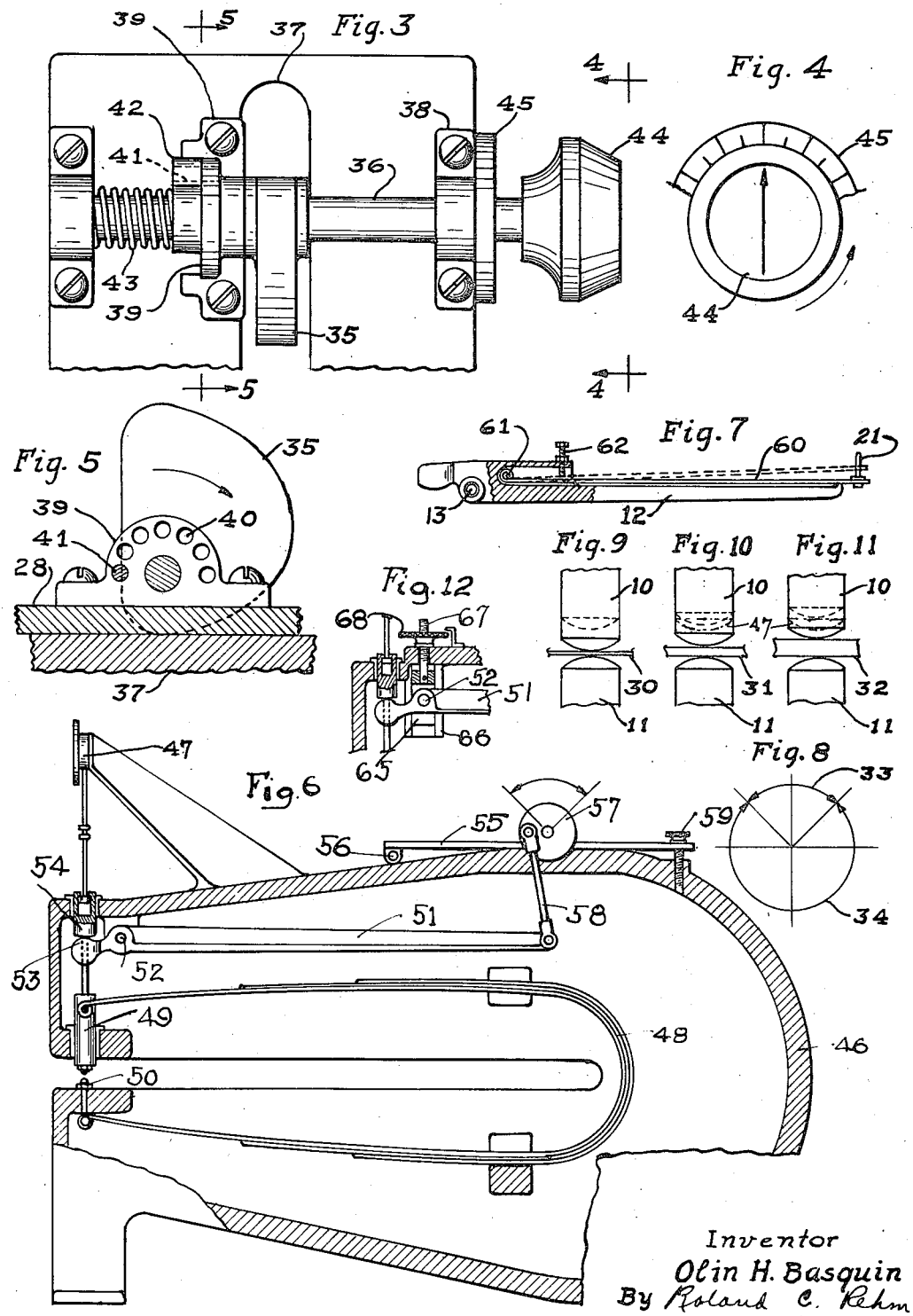
Inventor
Olin H. Basquin
By Roland C. Rehm
Attorney.

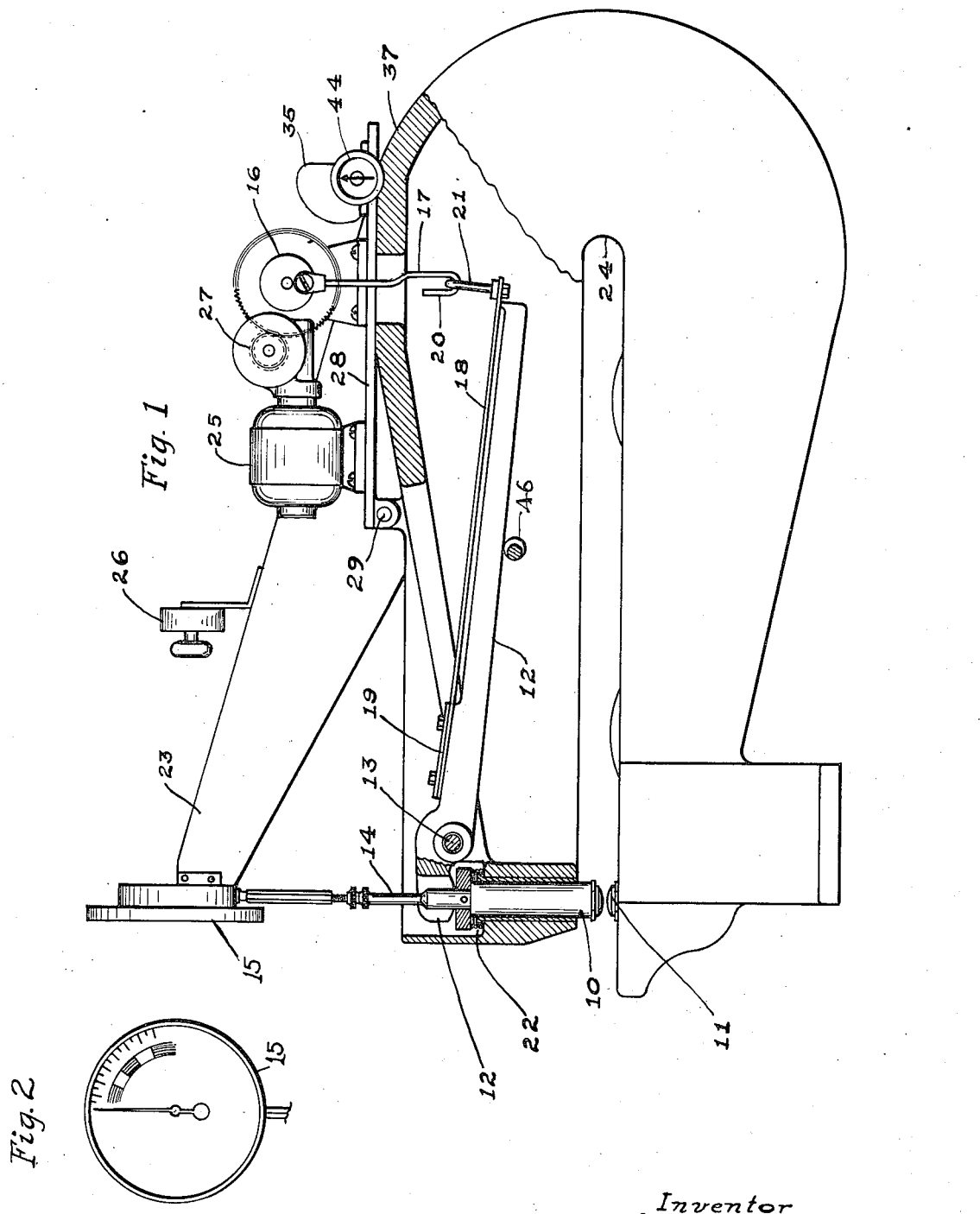

Patented June 8, 1943

2,321,121

UNITED STATES PATENT OFFICE 2,321,121

GAUGING APPARATUS

Olin H. Basquin, Evanston, Ill., assignor to Streeter-Amet Company, Chicago, Ill., a corporation of Illinois Application July 18, 1939, Serial No. 285,096

2 Claims. (Cl. 33—147)

This invention relates to gauging materials, such as sheet metal, and, among other objects, aims to provide apparatus of increased efficiency for gauging material.

The nature of the invention may be readily understood by reference to apparatus embodying the invention illustrated in the accompanying drawings.

Fig. 1 is an elevation of one form of gauging apparatus equipped with mechanism to adjust the apparatus for the most efficient operating cycle;

Fig. 2 is an elevation of the gauge dial;

Fig. 3 is a fragmentary plan view of the apparatus showing details of the adjusting mechanism;

Fig. 4 is an elevation of an adjusting handle taken from the plane 4—4 of Fig. 3;

Fig. 5 is an elevation of the adjusting cam;

Fig. 6 illustrates a different form of gauging apparatus equipped with adjusting mechanism;

Fig. 7 illustrates a detail of a different form of mechanism for effecting adjustment of the apparatus;

Fig. 8 is a diagram illustrating the significant portions of the gauging cycle;

Figs. 9, 10 and 11 are exaggerated diagrammatic views illustrating the shifting of the zone of oscillation of the upper jaw relative to the lower jaw for sheets of varying thickness; and Fig. 12 is an elevation of a detail illustrating another adjusting device.

In many industries, it is necessary to perform gauging operations either on stock or finished material to determine whether it falls within allowable tolerances. With sheet metal and other sheet material, for example, fabricated by drawing, pressing and other operations, it is important to determine in advance whether the thickness of the metal falls within allowable tolerances. In drawing operations, if the metal be too thin at one or more points, there may be insufficient metal to make a complete article. If the metal be too thick, its cost is not only excessive but it does not draw well. If the metal be fabricated, it is difficult or impossible to obtain credit if the metal proves to be off-gauge. For these and other reasons, it is highly important to gauge the thickness of a sheet or other material in advance of fabrication at a sufficient number of points to determine whether or not the material is off-gauge. In rolled sheet metal particularly, the sheet often varies from edge to edge. If the forming rolls deflect slightly or are not true, the sheet is likely to be thicker in the middle than at the edges. When such sheets are cut into smaller sheets, the smaller sheets are likely to be thicker along one edge than on the opposite edge. To determine departure from proper gauge, it is desirable to gauge the sheet at a plurality of points across each end and if it be of considerable length at one or more points across the sheet intermediate its ends.

To facilitate this operation, gauges having automatically opening and closing gauging jaws or anvils have been provided. One such gauge is shown in Guyer Patent No. 2,134,184. Another gauge for a similar purpose is manufactured by Federal Products Corporation of Providence, Rhode Island. After each gauging operation, the gauging jaws automatically open to permit the sheet or other article to be moved along to the next gauging point. Preferably, for sheet gauging, the gauge is provided with deep jaws to embrace practically the entire width of the sheet, thereby simplifying the manipulation of the sheet in the gauge, making it necessary simply to slide the sheet along through the gauge from one end to the other.

For efficient operation, the gauging jaws should remain closed only long enough for the operator to observe whether the material falls within allowable tolerances and they should be open long enough to permit the sheet to be shifted. Excessive gauging or "moving" intervals, or an improper division of the cycle between gauging and moving phases, results in high gauging costs. Gauges heretofore on the market have not operated with equal efficiency on material of different thickness. For example, if the apparatus operate efficiently on thin material such as 24 gauge (.0245" thickness), it will not operate efficiently on substantially thicker material. This variation in efficiency in machines now on the market arises because the closing and separating motion of the gauging jaws is the same for thick material as for thin material. Therefore, with thick material the jaws engage the material at an earlier point in the cycle and release it at a later point in the cycle, thereby allowing an excessive time for reading the gauge and an insufficient time to move the sheet along through the gauge. It will be understood that, whenever the jaws close on the sheet, its motion must be arrested until the jaws again release it. It is, therefore, impossible to shift a sheet a substantial distance through the gauge without arresting its movement one or more times when the jaws close on it.

I have discovered that the efficiency of gauging machines may be substantially increased if the gauging cycle be adjusted for each thickness of sheet so that with an appropriate frequency of operation of gauging jaws there is a proper division of each cycle between the gauging interval and the sheet moving interval (when the jaws are released). Mechanism for this purpose is shown embodied in gauging apparatus illustrated in the drawings.

In the apparatus illustrated in Figs. 1 to 5, the foregoing adjustment is effected by relatively shifting the operative zone of closing and opening movement of the gauging jaws and by appropriately varying the frequency of jaw operation. As there shown, the movable jaw 10 is reciprocated relative to the stationary jaw 11 by a lever 12 pivoted at 13. The plunger 14 of gauge 15 follows the movements of the upper jaw and when the latter closes on a sheet resting on the lower jaw, the gauge shows the thickness of the sheet. The gauge dial advantageously reads not only in thousandths of an inch but in standard gauge units. The dial may also be marked in sectors prominently displayed adjacent the various gauges to indicate the allowable tolerances for each gauge (see Fig. 2). Thus in reading the gauge, the operator need note merely whether or not the pointer falls within a given sector. Lever 12 is oscillated to open and close the jaws by appropriate mechanism here shown in the form of a motor driven crank disc 16 connected to lever 12 by link 17. The oscillating mechanism is designed to provide lost motion between it and the movable jaw to permit movement of the oscillating mechanism after the jaw has engaged the sheet. Such lost motion is in this instance provided by connecting the oscillating mechanism with lever 12 through a leaf spring 18 fixed to the lever at 19. In the present instance, the leaf spring is sufficiently stiff to insure adequate pressure of the jaw on the work so as to secure reliable gauge readings. Link 17 has a loose connection with the spring 18, such connection here being shown in the form of an open hook 20 engaging an elongated eye or loop 21. Thus the oscillating mechanism moves the upper jaw in one direction; spring 22 moves it in the other. Gauge 15 is advantageously mounted independently of the jaws so as not to be affected by a slight deflection of the jaw yoke under the pressure exerted on the sheet by the jaws. In the present instance, the gauge is supported by an independent structure 23 connected with the lower jaw only. Both the jaws and the structure 23 are provided with a relatively deep throat 24 to receive sheets of substantial width.

Motor 25 for driving the crank disc 17 is provided with a rheostat 26 for varying the frequency of oscillation of the jaw. The motor is here shown equipped with a built-in speed reduction mechanism 27 for substantially reducing the speed of the crank disc 16 relative to the motor.

Appropriate mechanism is provided for shifting the zone of oscillation of the movable jaw (relative to the fixed jaw) to adjust the apparatus for efficient operation to sheets of various thickness. That here shown comprises means for shifting the oscillating mechanism itself. The latter mechanism is shown mounted on a base 28 pivoted at 29 to the frame of the apparatus. Means adjacent the opposite end of the platform are provided for rocking the latter relative to the apparatus to move the crank disc 16 and its associated mechanism relative to the lower jaw. The effect of such adjustment is illustrated diagrammatically in Figs. 9, 10 and 11. Fig. 9 illustrates the zone of movement of the jaws for a sheet 30 of minimum thickness. The amplitude of oscillation of the jaws has been substantially exaggerated to facilitate illustration. In the illustrative apparatus, the maximum amplitude of oscillation of the upper jaw actually is about one-tenth of an inch. For this adjustment, the oscillating mechanism has been elevated its maximum amount so as to bring the movable jaw close to the lower jaw.

Fig. 10 illustrates one intermediate position for a thicker sheet 31 showing the zone of oscillation of the jaws to be separated farther from the fixed jaw 11. This adjustment is brought about by bringing the crank disc and its associate mechanism closer to the fixed jaw, thereby moving the movable jaw farther from the fixed jaw.

Fig. 11 illustrates the adjustment for a sheet 32 of maximum thickness, that is, maximum thickness of a sheet which can be handled by the present apparatus. There the zone of oscillation of the movable jaw is still farther removed from the fixed jaw.

As a result of the foregoing adjustments, a proper division between the gauge reading interval (during which the jaws engage the sheet) and the moving interval (during which the jaws release the sheet) may be effected. This is illustrated diagrammatically in Fig. 8. The reading or "jaw engaged" interval is represented by the sector 33. The balance of the cycle represented by the sector 34 represents the interval during which the sheet is free to be moved. In other words, sector 33 represents that portion of the cycle wherein the jaws are in engagement with the sheet. The operation of this portion of the cycle obviously depends upon the location of the zone of oscillation of the movable jaw in relation to the thickness of the sheet. If a thick sheet were engaged in the apparatus with the jaws adjusted as illustrated in Fig. 9, obviously the portion of the cycle covered by sector 33 would be substantially greater than for a thin sheet, thus allowing insufficient time for shifting of the sheet through the apparatus. The following table will serve to illustrate the variation in relation between moving and reading which would occur without adjustment of the zone of oscillation of the gauge jaw.

| Material thickness in inches | Reading time per cent of cycle | Moving time per cent of cycle |
| --- | --- | --- |
|  | Per cent | Per cent |
| .038 | 45 | 55 |
| .059 | 54 | 46 |
| .075 | 61 | 39 |
| .081 | 64 | 36 |
| .0255 | 38 | 62 |
| .0585 | 53 | 47 |
| .003 | 23 | 77 |

In the present instance, the reading interval (represented by sector 33) consumes about 25% of the cycle and the moving interval consumes the balance of the cycle. For sheet materials, this division of the cycle represents an advantageous relation between gauge reading and sheet moving. In general, moving of the sheet from one place to another requires a major portion of the cycle.

Adjustment of the zone of oscillation of the upper jaw by means of cam 35 requires no adjustment of the "zero" setting of gauge 15.

The details of one form of the adjusting mechanism are illustrated in Figs. 1 to 5. Rocking of the platform 28 is effected by cam 35 keyed to shaft 36. The cam bears on a portion of the upper surface of jaw yoke 37. Shaft 36 is mounted in bearings 38 on platform 28. The cam is held in adjusted position by a selector disc 39 having a series of recesses 40 into which a selector pin 41 carried by shaft 36 is adapted to be selectively seated. Selector disc 39 is advantageously mounted on platform 28 and is penetrated by shaft 36. In the present instance, selector pin 41 is carried by a collar 42 fixed to shaft 36. The collar and its pin are urged against the disc by spring 43. Shaft 36 is longitudinally slidable in its bearings to permit it to be moved to clear the selector disc. To effect an adjustment, the shaft is moved longitudinally by an appropriate knob or handle 44 against the spring 43 to clear selector pin 41 after which it may be rotated to the selected position and released to permit engagement of the selector pin with the appropriate opening in the selector disc. Preferably the shaft is equipped with a dial or scale 45 to indicate the proper adjustment for sheets of different gauge.

The apparatus may advantageously be provided with a means for preventing excessive and unnecessary rotation of the gauge pointer and its mechanism. Being an instrument of precision and, therefore, delicate, it is desirable to minimize wear. In the apparatus shown in Fig. 1, gauge wear is minimized by arresting the upward movement of the upper jaw at a point sufficient to clear the sheet. In the present instance, an adjustable stop 46 is placed in the path of lever 12. The stop in this instance is cam shaped to permit adjustment of the limit point. Arresting the lever does not modify the relation between the "gauge reading" and "moving" phases 33 and 34. The lost motion connection (hook 20 and loop 21) in the jaw operating mechanism allows the latter to move in its adjusted cycle with the same effect as regards division of the cycle, as though the stops were not employed. In Figs. 10 and 11 the dot and dash outlines 47 illustrate the effect of the stop in eliminating unnecessary gauge movement.

In Fig. 6 is illustrated a different form of gauging apparatus wherein the yoke or C-frame 46 is relieved of any deflecting forces (which would cause an error in the reading of gauge 47) when the readings are being taken. This result is secured in the present instance by applying pressure to the sheet being gauged by a large C-spring 48 which tends to grip the sheet and when so gripping it imposes no strains on the C-frame 46 which would cause deflection thereof and erroneous dial readings. Force is transmitted from the C-frame only to separate movable jaw 49 from the stationary jaw 50. This, of course, occurs during the interval when no gauge reading is being taken and it is therefore immaterial whether or not the C-frame is deflected by the force exerted on the spring 48.

The force to open the jaws is applied in this instance by lever 51 pivoted at 52 and having its nose 53 bearing upon a guiding plunger 54 with which the gauge 47 and upper jaw 49 are connected. Lever operating mechanism may advantageously be the same as that shown in Fig. 1 wherein the motor drive and its reducing gearing is mounted on a tiltable platform 55 pivoted at 56. The crank disc 57 corresponds to the crank disc 16 in Fig. 1 and oscillates lever 51 through link 58. The platform 55 and its operating mechanism may be tilted for purposes of adjusting the zone of oscillation of the upper jaw by an adjusting cam such as cam 35 in Fig. 1 or as here shown by a simple adjusting screw 59. In the present mechanism the oscillating mechanism applies force to separate the jaws whereas in the mechanism shown in Fig. 1 the force is applied to close the jaws. In the latter mechanism the nose 53 of lever 51 is free to travel downwardly and away from plunger 54 when the latter is arrested by engagement with a sheet.

In Fig. 7 is illustrated another method of adjusting the zone of operation of the upper jaw, applied to apparatus such as illustrated in Fig. 1. As here shown, the angular relation between the jaw oscillating lever 12 and the oscillating mechanism is shifted. This in effect shifts the point of connection of the operating mechanism relative to the oscillating lever 12. In the present instance, a leaf spring 60 of the general type of the spring 18 shown in Fig. 1 is pivoted at 61 to lever 12 and is provided with an adjusting screw 62 by which its angular position (represented by dotted lines) relative to lever 12 may be adjusted. Spring 60 is connected in the same manner as illustrated in Fig. 1 to the oscillating mechanism. Manipulation of the adjusting screw 62 changes the angular relation of lever 12 with spring 60 and the oscillating mechanism, and thus adjusts the zone of oscillation of the upper jaw relative to the lower jaw for the purposes above-described.

Fig. 12 illustrates a different form of adjusting mechanism wherein the oscillating lever for operating the jaws is adjusted by adjusting the lever pivot. This form of adjustment is shown applied to apparatus like that shown in Fig. 6 but it obviously may be employed in other forms of lever operated apparatus, such as shown in Fig. 1. As here shown, the pivot 52 of lever 51 is mounted on a slidable block 65 slidable in guideways 66 and adjusted by a screw 67 and nut 68. In this type of adjusting mechanism the lever oscillating mechanism may be fixed and requires no adjustment.

Other though probably less practical forms of adjusting mechanism may be employed, such, for example, as adjustment of the length of the link (17 or 58 in Figs. 1 and 6, respectively). Variation in the lengths of these links would, of course, shift the zone of oscillation of the upper jaw. Adjustment may also be effected by changing the elevation of the bearing of the nose of the operating lever relative to the upper jaw. The foregoing sufficiently indicates the application of the principle of shifting the zone of oscillation of the gauging jaws.

Obviously this principle is not limited to the particular gauges here illustrated nor to the details of the illustrative adjusting apparatus. Moreover, various features of the invention may be embodied in different combinations and subcombinations.

Having described my invention, I claim:

1. Gauging apparatus of the character described comprising in combination movable and stationary jaws, mechanism for oscillating said movable jaw for periodically engaging and releasing material being gauged, an indicator responsive to the position of the movable jaw for indicating the gauge reading of the material when the jaws are closed on it, said oscillating mechanism being mounted so as to be shiftable relative to said apparatus, and a cam for changing the position of said mechanism to vary the zone of oscillation of said movable jaw relative to said stationary jaw.

2. Gauging apparatus of the character described comprising in combination a pair of relatively movable gauging jaws, automatic means for periodically opening and closing said jaws on material to be gauged, an indicator operatively associated with said jaws and responsive to their relative position for indicating the gauge reading, and mechanism for bodily shifting said automatic means relative to one of said jaws to vary the maximum separation of said jaws.

OLIN H. BASQUIN.